US008854459B2

(12) United States Patent
Yip

(10) Patent No.: US 8,854,459 B2
(45) Date of Patent: Oct. 7, 2014

(54) DELIVERING A SUPPLEMENTED CCTV SIGNAL TO ONE OR MORE SUBSCRIBERS

(75) Inventor: Robert Hingyee Yip, London (CA)

(73) Assignee: BCE Inc., Montreal (CA)

( * ) Notice: Subject to any disclaimer, the term of this patent is extended or adjusted under 35 U.S.C. 154(b) by 1844 days.

(21) Appl. No.: 11/642,736

(22) Filed: Dec. 21, 2006

(65) Prior Publication Data

US 2007/0199042 A1    Aug. 23, 2007

(51) Int. Cl.
| | | |
|---|---|---|
| H04N 7/18 | (2006.01) | |
| H04N 21/222 | (2011.01) | |
| H04N 21/236 | (2011.01) | |
| H04N 21/214 | (2011.01) | |
| H04H 20/04 | (2008.01) | |
| H04N 21/2365 | (2011.01) | |
| H04H 20/30 | (2008.01) | |
| H04H 20/63 | (2008.01) | |
| H04N 21/434 | (2011.01) | |
| H04H 60/16 | (2008.01) | |
| H04N 7/10 | (2006.01) | |

(52) U.S. Cl.
CPC ............... *H04N 7/186* (2013.01); *H04H 60/16* (2013.01); *H04N 21/2221* (2013.01); *H04N 7/181* (2013.01); *H04N 7/10* (2013.01); *H04N 21/23608* (2013.01); *H04N 21/2143* (2013.01); *H04H 20/04* (2013.01); *H04N 21/2365* (2013.01); *H04H 20/30* (2013.01); *H04H 20/63* (2013.01); *H04N 21/4347* (2013.01)
USPC ............................................ 348/143; 348/61

(58) Field of Classification Search
USPC .................................................. 348/61, 143
See application file for complete search history.

(56) References Cited

U.S. PATENT DOCUMENTS

| | | | | |
|---|---|---|---|---|
| 4,074,310 | A | | 2/1978 | Hurney et al. |
| 4,149,184 | A | * | 4/1979 | Giddings et al. ................ 348/34 |
| 4,450,481 | A | * | 5/1984 | Dickinson ..................... 380/209 |
| 4,994,916 | A | * | 2/1991 | Pshtissky et al. ............. 348/159 |
| 5,654,750 | A | * | 8/1997 | Weil et al. ...................... 348/143 |
| 5,686,960 | A | * | 11/1997 | Sussman et al. ........... 348/218.1 |
| 5,721,792 | A | * | 2/1998 | Thompson .................... 382/274 |
| 6,081,291 | A | * | 6/2000 | Ludwig, Jr. ................ 348/14.11 |
| 6,665,004 | B1 | * | 12/2003 | Paff ............................... 348/156 |
| 6,970,183 | B1 | * | 11/2005 | Monroe ........................ 348/143 |
| 6,972,786 | B1 | * | 12/2005 | Ludwig ..................... 348/14.11 |
| 7,136,109 | B2 | * | 11/2006 | Alkhalili et al. .............. 348/537 |

(Continued)

OTHER PUBLICATIONS

Identivue Limited, "iptv.co.uk—the future for CCTV" [online], Internet page from Aug. 2005 at www.iptv.co.uk/about.html, Retrieved from the Internet on Oct. 17. 2007 through web.archive. org: <URL:http://web.archive.org/web/20050828105500/www.iptv.co.uk/about.html>.

(Continued)

*Primary Examiner* — David Lazaro
*Assistant Examiner* — Vitali Korobov
(74) *Attorney, Agent, or Firm* — Robic, LLP

(57) ABSTRACT

A method and a system are provided for delivering a supplemented CCTV message to subscribers, such as residents of a MDU. A processor combines the signal from a local CCTV camera system with a supplementary message to be provided to subscribers. The supplemented CCTV signal resulting from this combining is inserted into a dedicated channel of an incoming broadcast television feed. For a digital television feed, the supplemented CCTV signal may be forwarded to a central office managing television feeds for this particular location, so that the inserting may take place thereat.

56 Claims, 6 Drawing Sheets

(56) References Cited

U.S. PATENT DOCUMENTS

| | | | | |
|---|---|---|---|---|
| 7,425,987 | B2* | 9/2008 | Creamer et al. | 348/211.3 |
| 7,428,004 | B2* | 9/2008 | Creamer et al. | 348/211.3 |
| 7,515,739 | B2* | 4/2009 | Porter et al. | 382/118 |
| 7,630,561 | B2* | 12/2009 | Porter et al. | 382/218 |
| 2003/0133041 | A1* | 7/2003 | Curtis et al. | 348/462 |
| 2003/0141980 | A1* | 7/2003 | Moore et al. | 340/578 |
| 2003/0179318 | A1* | 9/2003 | Alkhalili et al. | 348/537 |
| 2004/0109059 | A1* | 6/2004 | Kawakita | 348/143 |
| 2005/0144653 | A1* | 6/2005 | Creamer et al. | 725/148 |
| 2005/0225637 | A1* | 10/2005 | Eghbalian | 348/155 |
| 2005/0240976 | A1* | 10/2005 | Kim | 725/109 |
| 2006/0044446 | A1* | 3/2006 | Porter et al. | 348/333.11 |
| 2006/0170791 | A1* | 8/2006 | Porter et al. | 348/231.3 |
| 2007/0247525 | A1* | 10/2007 | Samarasekera et al. | 348/159 |

OTHER PUBLICATIONS

AzteQ Solutions Ltd, "IT Solutions" [online], Internet page from Nov. 2005 at www.azteqsolutions.com/78460.html, Retrieved from the Internet on Oct. 17, 2007 through web.archive.org: <URL:http://web.archive.org/web/20040923063050/www.azteqsolutions.com/78460.html>.

Norsat (Infosat Communications), "CCTV (Closed Circuit TV)" [online], Internet page from Dec. 2005 at www.infosat.com/security/closed-circuit-tv.htm, Retrieved from the Internet on Oct. 17, 2007 through web.archive.org: <URL:http://web.archive.org/web/20060615033152/www.infosat.com/security/closed-circuit-tv.htm>.

* cited by examiner

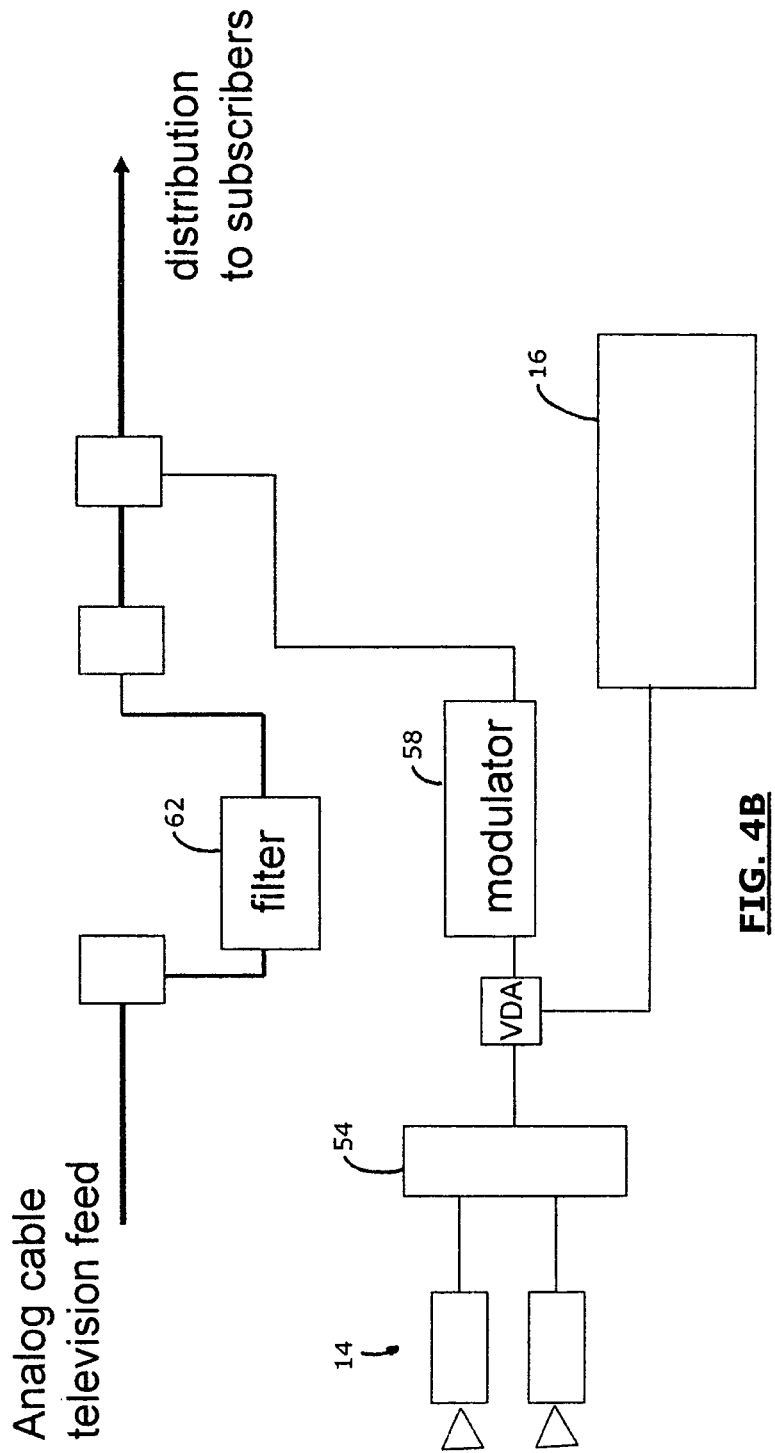

DELIVERING A SUPPLEMENTED CCTV SIGNAL TO ONE OR MORE SUBSCRIBERS

BRIEF SUMMARY OF THE INVENTION

The present invention relates to the field of television services and more particularly concerns a method and a system for delivering a CCTV signal supplemented with a message to subscribers of a television feed.

BACKGROUND OF THE INVENTION

Closed Circuit Television (CCTV) is an application which allows a person to view on a television set a camera feed from a nearby location, typically from inside a building this person is located in. CCTV is for example used by residents of a Multi-Dwelling Unit (MDU), such as a condominium or apartment building, to view an internal camera feed provided by one or multiple security cameras at the building entrance allowing the residence to view visitors before letting them in. CCTV systems are also used for security purposes in commercial or professional buildings where the CCTV feed is typically monitored by security personnel or an automated system.

In most residential and some commercial applications, CCTV signals are provided through television channels. Cable companies providing an analog television service to customers living in MDUs often offer to integrate the local CCTV signal in their own cable feed. This is usually accomplished by filtering the incoming cable television signal to remove one channel therefrom and substituting in its place the properly modulated CCTV signal before distribution to the subscribing unit of the MDU. However, when dealing with fully digital TV, this approach cannot be used, as the incoming digital signal is only decoded at the set top box in each subscribing unit. In order to properly encode the CCTV signal and integrate it in the regular digital television feed, the approach previously employed has been to send the local, unencoded CCTV signal from the MDUs to the closest headend, where the CCTV signals from all the subscribing MDUs serviced by the same headend are digitally encoded and multiplexed with the entire broadcasted digital television feed. From there, the resulting television feed is sent to all subscribing customers through various central offices. Although only the units of a particular MDU are allowed to see the CCTV signal from their local camera, the same signal is actually received by every subscriber in a large area, generating an important waste of bandwidth, and making this technique impossible to apply to a large scale.

While CCTV channels are useful, they usually serve only the very limited purpose of identifying visitors at the building entrance. While they need to be constantly operational, they are in fact consulted only sporadically. There is therefore a need for a manner of improving and make more profitable the use of CCTV channels.

SUMMARY OF THE INVENTION

In accordance with a first aspect of the invention, there is provided a method for delivering a supplemented CCTV signal to one or more subscribers, including:

a) receiving at least one supplementary message to be provided to the one or more subscribers;

b) combining a signal from a local CCTV camera system and the supplementary message into the supplemented CCTV signal; and c) causing transmission of the supplemented CCTV signal to the one or more subscribers as part of a television feed.

In accordance with another aspect of the invention, there is also provided a system for delivering a supplemented CCTV signal to one or more subscribers, including:

a processor operable to:
   receive at least one supplementary message to be provided to the one or more subscribers;
   receive a signal from a local CCTV camera system; and
   combine the signal from the local CCTV camera system and the supplementary message into the supplemented CCTV signal; and
transmission means operable to cause transmission of the supplemented CCTV signal to the one or more subscribers as part of a television feed.

In accordance with yet another aspect of the invention, there is also provided a processor for generating a supplemented CCTV signal for delivery to one or more subscribers, including:

a port in communication with a local CCTV camera system for receiving a signal therefrom;
an interface operable to receive at least one supplementary message to be provided to the one or more subscribers; and
a combining module for combining the signal from a local CCTV camera system and the supplementary message into the supplemented CCTV signal.

Other features and advantages of the present invention will be better understood upon reading of preferred embodiments thereof with reference to the appended drawings.

BRIEF SUMMARY OF THE DRAWINGS

FIGS. 4A and 4B are schematic representations of two variants of systems providing a supplemented CCTV signal through a cable television feed according to embodiments of the present invention.

DESCRIPTION OF PREFERRED EMBODIMENTS OF THE INVENTION

In accordance with a first aspect of the present invention, there are provided a method and a system for delivering a supplemented CCTV signal to one or more subscribers. The expression "subscriber" is used herein to refer generally to any person or entity receiving and able to view the supplemented CCTV signal. The subscribers may be billed for this service or it may be provided free of charge, for example as a feature of a broadcast television feed service.

In an embodiment of the invention, the subscribers reside in units of a Multi-Dwelling Unit (MDU). The MDU may be embodied by any residential or commercial building with multiple offices, apartments or condominiums. All or a portion of the units of the MDU receive a television feed, as will be described in more details below.

Figure 5:
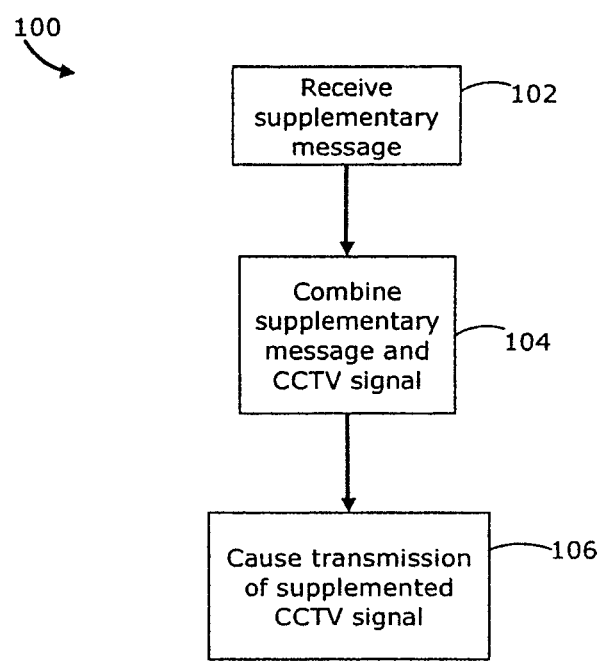
FIG. 5 is a flow chart illustrating the steps of a method for delivering a supplemented CCTV signal according to an embodiment of the invention.

Referring to FIG. 5, there is shown a flow chart illustrating a method 100 according to one embodiment of the invention.

The method first includes a step of receiving 102 at least one supplementary message 36 (see FIG. 3A or 3B) to be provided to the subscribers. The supplementary message may take a variety of forms, such as for example a text message, a graphical message, a sequence of graphical messages and a combination thereof. It may contain any relevant information to be conveyed to the subscribers. In the context of MDUs, the supplementary message could for example be used to announce a condo board meeting, elevator servicing, etc.

Figure 3A:
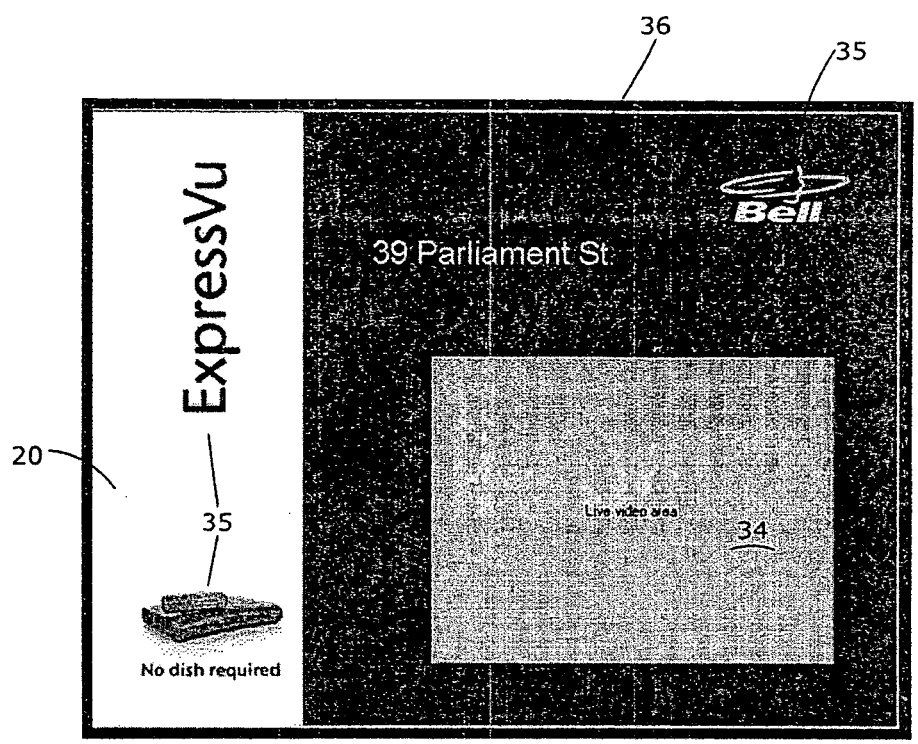
FIGS. 3A and 3B are exemplary representations of images seen by a subscriber of a service according to the present invention.

Referring to FIG. 3A, in one embodiment, the supplementary message 36 is provided on a background template 20. The background template 20 may be a file in any appropriate format, such as bit map, HTML, JPEG, MPEG or another appropriate format. In the illustrated embodiment, the supplementary message 36 is a text message appearing on the background template 20, which may also include background information 35 such as logos, trademarks, promotional messages or any other appropriate information. In an alternate embodiment, the background template 20 may include a plurality of background pages displayed in a sequence. Each background page may display a different supplementary message 36 or different background information 35.

Referring back to FIG. 5, the method 100 includes a next step of combining 104 a signal from a local CCTV camera system, hereinafter referred to as the CCTV signal, and the supplementary message into the supplemented CCTV signal.

The local CCTV camera system may include one or more cameras installed at an appropriate location in a building or building complex. In cases where multiple camera are provided, the CCTV signal could be alternating images from each individual camera, for example provided by a video sequencer. In the alternative, the signal from each camera of a multiple camera local CCTV camera system could be provided in a different supplemented CCTV signal, each delivered according to the present invention. Also alternatively, the signals from different cameras could be combined and displayed simultaneously, for example in a mosaic. It will be noted that for most applications, the CCTV signal need not provide a high definition image. As a matter of fact, existing CCTV cameras often provide a low resolution image, as it is not meant for prolong viewing.

The combining of the supplementary message and the CCTV signal may take a variety of forms. In the example shown in FIG. 3A, the CCTV image 34 representing the CCTV signal is overlaid on a portion of the background template 20. It may occupy any appropriate fraction of an area of the background template 20, such as for example a quarter, a half, etc. In the particular case illustrated in FIG. 3A, the background template 20 is a 640×480 bit map picture and the CCTV image 34 is a 320×240 pixel overlaid window. The supplementary message 36 may be provided on a portion of the background template 20 surrounding the CCTV image 34, along with the background information 35 such as logos and promotional information for the digital television service provider. Of course, any other configuration is considered within the scope of the present invention, as long as the CCTV image 34 and supplementary message 36 are both visible in a same image. The size and position of the CCTV image 34 overlay may vary, as long as it is sufficiently clear to serve its purpose. In an alternative embodiment, shown in FIG. 3B, the CCTV image 34 may occupy the whole screen and the supplementary message 36 could be overlaid thereon.

Referring again to FIG. 5, in an embodiment of the present invention, the receiving 102 and combining 104 of the present invention may occur at a location proximate the local CCTV camera system. For example, both steps may be performed by a processor (described further below) provided at such a location, for example in the same MDU building as the local CCTV camera system. In accordance with different variants of the receiving step 102 above, the supplementary message may be received from a source remote of this location, for example through an internet connection or a private telecommunication network. Alternatively, the supplementary message may be inputted locally. It may for example be typed on a keyboard connected to the processor and therefore be generated locally, or uploaded from a data storage medium such as a USB flash memory drive, tape drive, CD, DVD, floppy disk or the like.

The method 100 of the present invention also includes a step of causing the transmission 106 of the supplemented CCTV signal to the subscribers as part of a television feed. The television feed may be digital, such as IPTV, digital cable TV and VDSL TV. In such a case, the supplemented CCTV signal may be, once combined, digitally encoded in a format compatible with the digital television feed.

In the case of a VDSL television feed, the supplemented CCTV signal is in a format compatible for transmission through a VDSL line, such as an encapsulated real time MPEG format. The encoding may take place at a same location then the combining, and may for example be performed by the same processor.

In the case of transmission of the supplemented CCTV signal over a digital television feed, the step of causing transmission 106 may include forwarding the supplemented CCTV signal to a location, such as for example a central office, supplying the digital television feed to the subscribers. Central offices usually manage the television feed for a limited area. In the case of VDSL television, the supplemented CCTV signal may be forwarded to the central office through the upstream bandwidth of the same VDSL transmission line already providing the television feed to the subscribers through its downstream bandwidth. Alternatively, the supplemented CCTV signal may be forwarded to the central office through a different communication line such as a dial-up connection, a high speed DSL, cable or wireless internet connection, etc. Once received at the central office, the supplemented CCTV signal is integrated into a dedicated channel of the digital television feed supplied by this central office. It will therefore be received by every subscriber of digital television within the area covered by the central office. The central office may ensure that only the one or more subscribers to which the supplemented CCTV signal is destined are able to view this signal by authorizing them, and only them to do so. In this case, the supplemented CCTV signal may for example appear scrambled to other subscribers receiving the television feed from the same central office. Alternatively, the subscribers of a given MDU may be divided into sub-sets of subscribers which may each receive a dedicated supplemented CCTV signal destined specifically thereto. The central office may manage the authorizing process to ensure that only the appropriate subscribers are able to view any given supplemented CCTV signal. This alternative can be expanded to the point that each subscriber gets a personal supplemented CCTV signal where the CCTV signal, the supplementary message or both are personal.

In an alternative embodiment, the television feed to which the supplemented CCTV signal is to be integrated may be an analog television feed, for example transmitted through cable. In such a case, the digital supplemented CCTV signal resulting from the combining step 104 may be converted back to analog format and inserted into a dedicated channel of the analog cable television feed which is received at the location of the building using the present invention. The original signal associated with this dedicated channel may be removed from the analog cable television feed prior to inserting the supplemented CCTV signal therein.

In accordance with another aspect of the invention, there is provided a system for delivering a supplemented CCTV signal to one or more subscribers. Through this system, a signal from a local CCTV camera system supplemented by a supplementary message is provided to the subscribers through a broadcast television feed. The television feed may be digital or analog, and may for example be provided through cable, internet protocol or VDSL.

Figure 1:
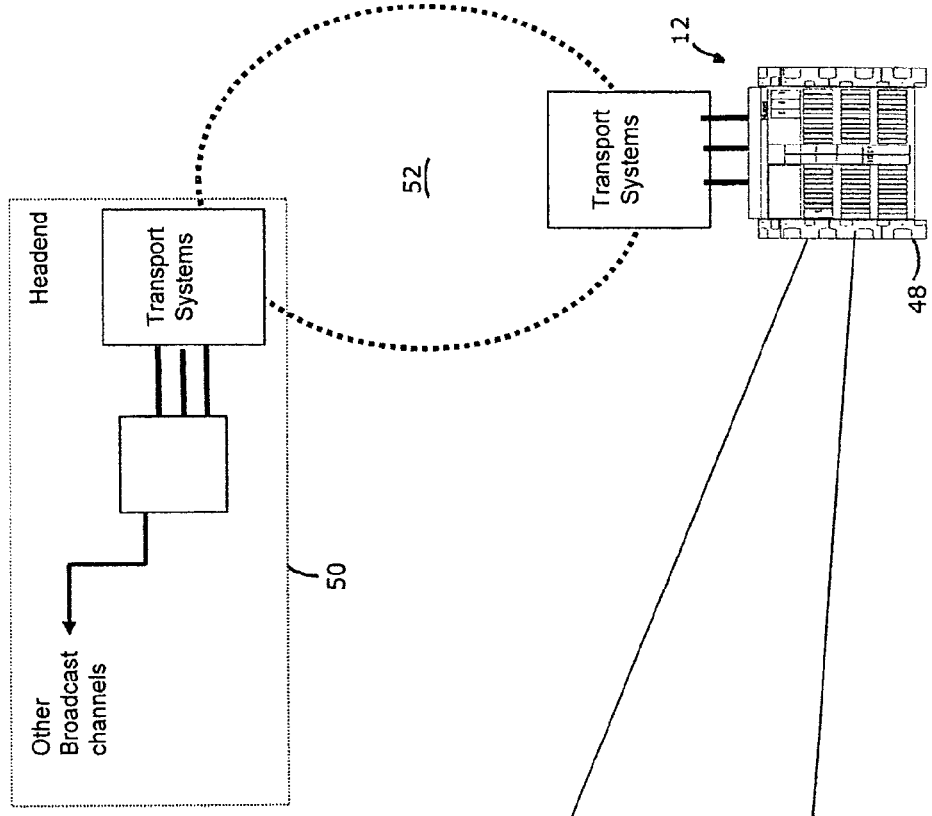
FIG. 1 is a schematic representation of a system according to a preferred embodiment of the invention.
Figure 1:
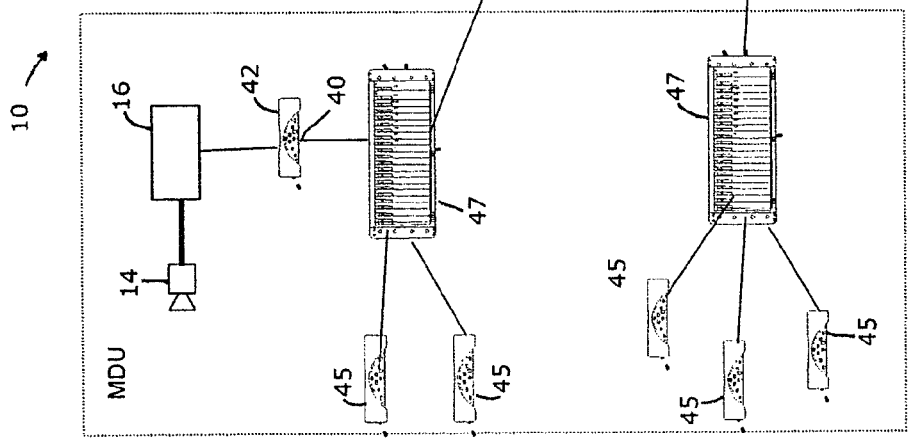

With reference to FIG. 1, there is shown a system 10 according to an embodiment the present invention applied to the context of VDSL television delivery. It will however be understood that this particular application-of the invention is given by way of example and that the system 10 may be used with other types of television feeds, examples of such embodiments being given further below. VDSL (Very-high-rate Digital Subscriber Line) is the fastest of xDSL technologies (45 mbps) and currently works only over a very short distance (approximately 1200 meters). VDSL technology is often used to allow subscribers to get digital television in places where it is not feasible, desirable, or allowed to install a satellite dish. It uses DSL line code modulated on a copper distribution pair to deliver digital broadband signals to the home. Typically, in a MDU environment, digital broadcast television is part of the broadband signal delivered to resident subscribers via the copper riser pair. A set top device 45 is required to decode the video portion of the signal for each connected television set. With VDSL, all digital broadcast television signals originate from a headend 50 from which the video signal is formatted according to a protocol compatible with the VDSL distribution system. An exemplary protocol compatible with the VDSL distribution system is the MPEG2 format From there, encoded broadcast television signals are transported through a transport system 52 to various central offices 12, each providing services to a particular subscriber set. For example, a particular central office 12 may provide services to a plurality of neighbouring MDUs or homes. Each central office 12 is provided with at least one central office terminal 48 managing the distribution of television channels to subscribers.

The system 10 shown in FIG. 1 first includes a processor 16, located proximate a local CCTV camera system 14. The local CCTV camera system 14 may include one or more cameras installed at an appropriate location in a building or building complex. In cases where multiple cameras are provided, their feed could be sequenced by a video sequencer to be viewed on a same channel, or each camera may be provided with its own channel. Alternatively, they could be shown together in a formatted display with multiple video feeds. Typically, such cameras are located in the lobby or another entrance area of a building so that its residents may be able to see and identify visitors before letting them in. The signal from the camera may be analog or digital. It will be noted-that-for most applications, the local CCTV camera system 14 need not provide a high definition image. As a matter of fact, existing CCTV cameras often provide a low resolution image, as it is not meant for prolong viewing. New dedicated cameras may be installed when setting up the present system 10, or the system 10 may be connected to pre-existing cameras.

Figure 2:
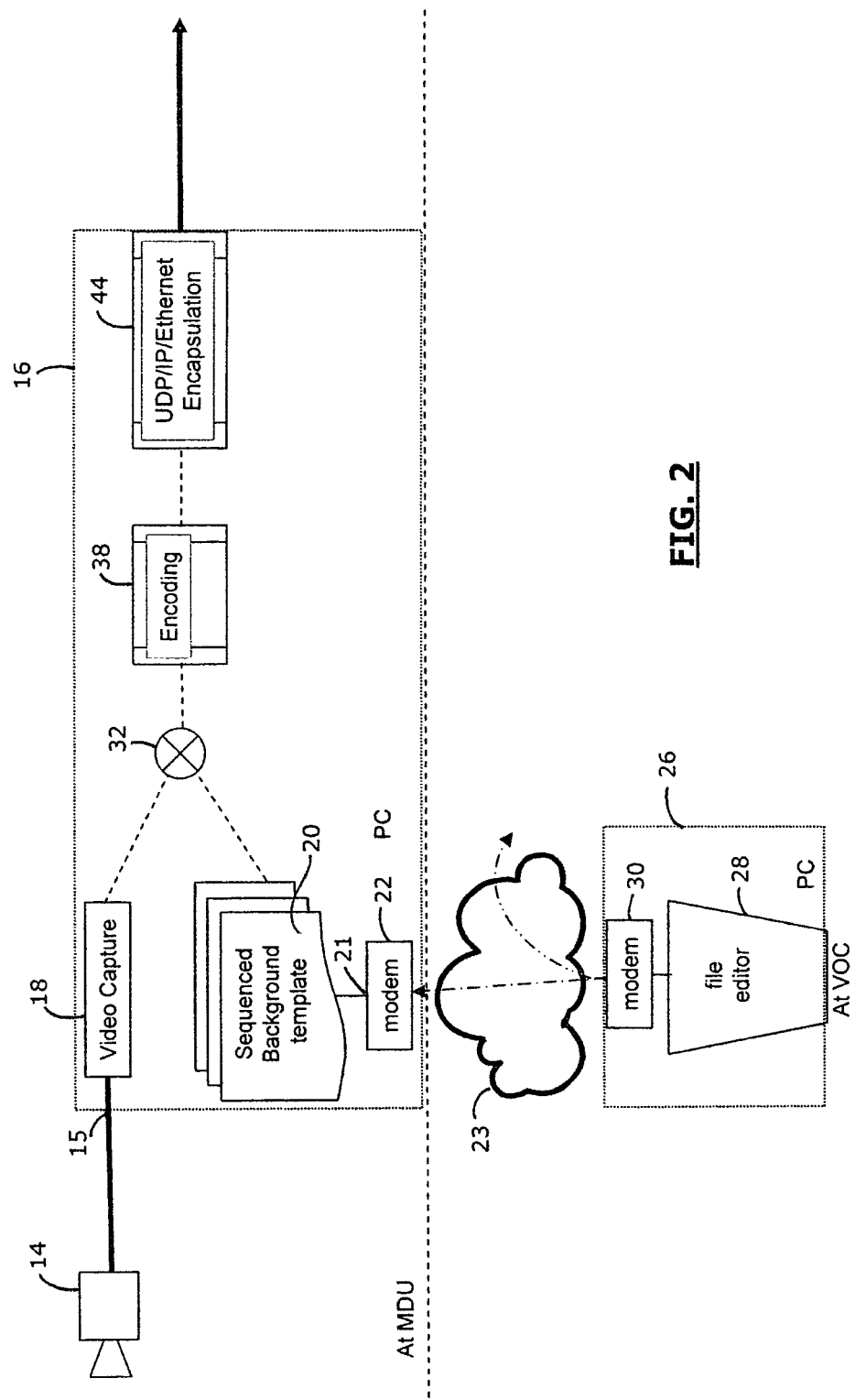
FIG. 2 is a schematic representation of the MDU and VOB based components of the system of FIG. 1.

Referring to FIG. 2, in one embodiment, the processor 16 is embodied by a personal computer (PC), which only needs limited processing capabilities. For example, a PentiumIII 450 Mhz processor running Windows2000OS (trademarks) has been used with success in the context of the present invention. The processor may of course be embodied by any other appropriate computer system, and may or may not be provided with peripheral components such as a keyboard and display screen, printer, data reader, etc, depending on the need for such components in a given embodiment of the present invention.

The processor 16 is operable to receive at least one supplementary message to be provided to the subscribers.

Figure 3B:
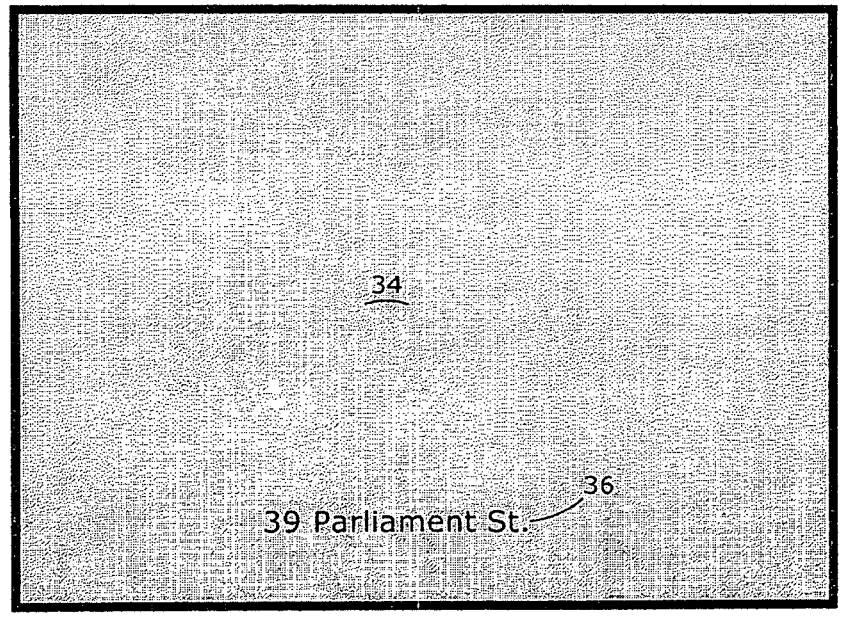

The supplementary message may take a variety of forms, such as for example a text message, a graphical message, a sequence of graphical messages and a combination thereof. It may contain any relevant information to be conveyed to the subscribers. In the context of MDUs, the supplementary message 36 could for example be used to announce a condo board meeting, elevator servicing, etc, or simply the address of the building at which the CCTV camera system is provided, as shown in FIGS. 3A and 3B. In another example the supplementary message could be used for advertising by representatives of the MDU, by the provider of the television feed or any other interested party. Advertisement spots could be offered for set time periods. Referring to FIG. 3A, in one embodiment, the supplementary message is provided on a background template 20. The background template 20 may be a file in any appropriate format, such as bit map, HTML, jpeg or the like. In the illustrated embodiment, the supplementary message 36 is a text message appearing on the background template 20, which may also include background information 35 such as logos, trademarks, promotional messages or any other appropriate information. In an alternate embodiment, the background template 20 may include a plurality of background pages displayed in a sequence. Each background page may display a different supplementary message 36 or different background information 35.

Referring back to FIG. 2, the processor 16 may receive the supplementary message 36 through a port 21 thereof and a modem 22 connected to this port 21. In this manner, the supplementary message may be received from a location remote of the processor 16, for example through a service provider network 23 or the internet. The modem 22 may be embodied by any appropriate communication device, such as a dial-up, DSL, VDSL, or wireless modem or the like. In one embodiment, the location remote of the processor 16 may be an operation center managing services to subscribers of the television feed, such as a VDSL Operation Center (VOC) in the case of VDSL television services. The VOC may be provided with a VOC processor 26, such as another PC, having a file editing application 28 for editing the background template 20 or another file containing the supplementary message. A modem 30 allows a connection between the VOC processor 26 and the processor 16 of the system 10 to transfer the supplementary message therebetween. It will be noted, as indicated on FIG. 2, that a single VOC processor 26 may be used to control the supplementary message for a plurality of MDUs, for example all the subscribing buildings served by this particular VOC. In such a case, the processor 16 at each MDU may be in communication with the VOC processor 26.

The information contained in the supplementary message may be managed by any relevant party. For example, in the context of a MDU, such a party may be embodied by a management of the MDU who wishes to provide information to their residents. Such a party may be given remote access to the VOC processor 26, for example through modem 30 or another remote connection, in order to modify the supplementary message when needed. In an alternate embodiment, the supplementary message may be edited by the VOC personnel upon request by the MDU management. Alternatively, the supplementary message 36 may be provided by another interested party such as an advertiser.

In an alternative embodiment, the processor 16 may be receive the supplementary message 36 through an input interface provided it locally. The input interface may for example be embodied by a keyboard for typing and therefore directly generating the supplementary message directly at the processor, which in this case may be a full computer terminal. At least one reader may also be connected to the processor for uploading the supplementary message from a data storage medium such as a USB flash memory drive, tape drive, CD, DVD, floppy disk or the like.

Referring to FIGS. 1 and 2, the processor 16 is further operable to combine the supplementary message with a CCTV signal received from the CCTV camera system 14.

In one embodiment, a port 15 of the processor 16 is in communication with the local CCTV camera system 14, for example through a baseband connection, to receive the CCTV signal therefrom. A video capture application 18 may be provided in the processor 16 to pre-process the CCTV signal, as needed. If the CCTV signal is analog, then it may be converted to a digital CCTV signal by the video capture application 18. In one embodiment, the video capture application 18 may encode the CCTV signal at 15 fps, which is considered a sufficient image quality for the limited viewing such an image typically receives. The resulting image may be re-sized if necessary.

A combining module 32 may be further provided for combining the CCTV signal from the video capture application 18 and the supplementary message from the receiving means. The combining of the supplementary message and the CCTV signal may take a variety of forms. In the example shown in FIG. 3A, a CCTV image 34 of the CCTV signal is overlaid on a portion of the background template 20. It may occupy any appropriate fraction of an area of the background template 20, such as for example a quarter, a half, etc. In the particular case illustrated in FIG. 3A, the background template 20 is a 640×480 bit map picture and the CCTV image 34 is a 320×240 pixel overlaid window. The supplementary message 36 may be provided on a portion of the background template 20 surrounding the CCTV image 34, along with background information 35 such as the logo and promotional information for the digital television service provider. Of course, any other configuration is considered within the scope of the present invention, as long as the CCTV image 34 and supplementary message 36 are both visible in a same image. The size and position of the CCTV image 34 overlay may vary, as long as it is sufficiently clear to serve its purpose. In an alternative embodiment shown in FIG. 3B, the CCTV image 34 may occupy the whole screen and the supplementary message 36 could be overlaid thereon. This embodiment may be particularly advantageous if the CCTV signal includes plural CCTV images from different camera displayed simultaneously, in which case the supplementary message may appear on only one or across a sub-set of these CCTV images.

The system of the present invention further includes transmission means operable to cause transmission of the supplemented CCTV signal to the subscribers as part of the television feed also provided to these subscribers. As explained above, typical VDSL television distribution networks include central offices where digital television feeds are encoded for transmission to sets of subscribers in a delimited area. As the television feed is only decoded at the set top boxes of the individual subscribers, there is no opportunity between the central office and a set top box to insert the supplemented CCTV signal in the television feed. Therefore, in the embodiment of FIGS. 1 and 2, the transmission means operable to cause transmission include a central office terminal 48 supplying the digital television feed to the one or more subscribers, to which the supplemented CCTV signal is forwarded. The central office terminal 48 includes an interface operable to receive the supplemented CCTV signal, and an integrating module for integrating the supplemented CCTV signal into a dedicated channel of the television feed supplied by this central office.

In order to forward the supplemented CCTV signal to the central office terminal, the processor 16 may include an encoding module 38 for digitally encoding the supplemented CCTV signal for transport through the appropriate communication lines, such as for example a VDSL line 46. In this case the encoding module 38 converts the supplemented CCTV signal to an appropriate format such as the MPEG2 protocol. In one specific non-limiting example, the supplemented CCTV signal may be transmitted through the upstream bandwidth of the VDSL line 46 providing the digital television feed to the subscribers of the MDU. In such a case, the physical interface between the processor 16 and the VDSL upstream may be an Ethernet port 40 on a VDSL Ethernet modem 42 connected to the processor 16. For example, in the embodiment of FIG. 2, the encoded supplemented CCTV signal is encapsulated over UDP over Ethernet by encapsulation module 44. Alternatively, the supplemented CCTV signal may be forwarded to the central office 12 through a different communication line such as a dial-up connection, a high speed, DSL, cable or wireless internet connection, etc.

In a typical MDU VDSL installation, as shown in FIG. 1, at least one gateway 47 is preferably provided at the MDU's premises. The gateways 47 may be embodied by a Broadband Service Access Multiplexer (BSAM; trademark of Motorola) providing the incoming digital television feed over an existing copper infrastructure and distributing it to the set top boxes 45 at each subscribing unit of the MDU.

In the embodiment of FIG. 1, the VDSL line 46 is connected to the central office terminal 48. The central office terminal 48 provides and allocates the digital television feed to the units of the MDU, and receives regular broadcast channels encoded for delivery from the headend 50 through the transport system 52, typically an optical fiber Dense Wavelength Division Multiplexing (DWDM) system or other appropriate telecommunication system. Once the central office terminal 48 receives the supplemented digital CCTV signal from the digital communication line 46, it integrates it in a dedicated channel of the digital television feed. For example, the supplemented digital CCTV signal may be mapped to a port of the central office terminal 48 which carries the broadcast TV channels from the headend 50. This is possible as the supplemented CCTV signal is already properly encoded for VDSL delivery by the encoder 16. The dedicated channel will therefore be carried to every MDU receiving a television feed from this particular central office 12. The central office terminal 48 may include an authorization module operable to only authorize the units of the target MDU to access this dedicated channel, in the same manner as subscriptions to regular broadcast television channels are managed. It will be noted that with this embodiment, the supplemented CCTV signal from a given MDU is transmitted to all subscribers managed by the same central office. It is therefore necessary to assign a different dedicated channel to the supplemented CCTV signal of each MDU connected to a given central office. However, the same channel could be used for the supplemented CCTV signal of a MDU connected to another central office, which greatly reduces the necessary bandwidth to upscale the implementation of digital CCTV services.

It will be noted that should the central office terminal be located locally of an MDU, as is for example possible for very large MDUs where such a financial investment is warranted. In such a case, it is possible that the digital supplemental CCTV signal could be added to the broadcast television feed locally, thus eliminating the need for transmitting the supplemented CCTV signal to a remote central office.

Figure 4A:
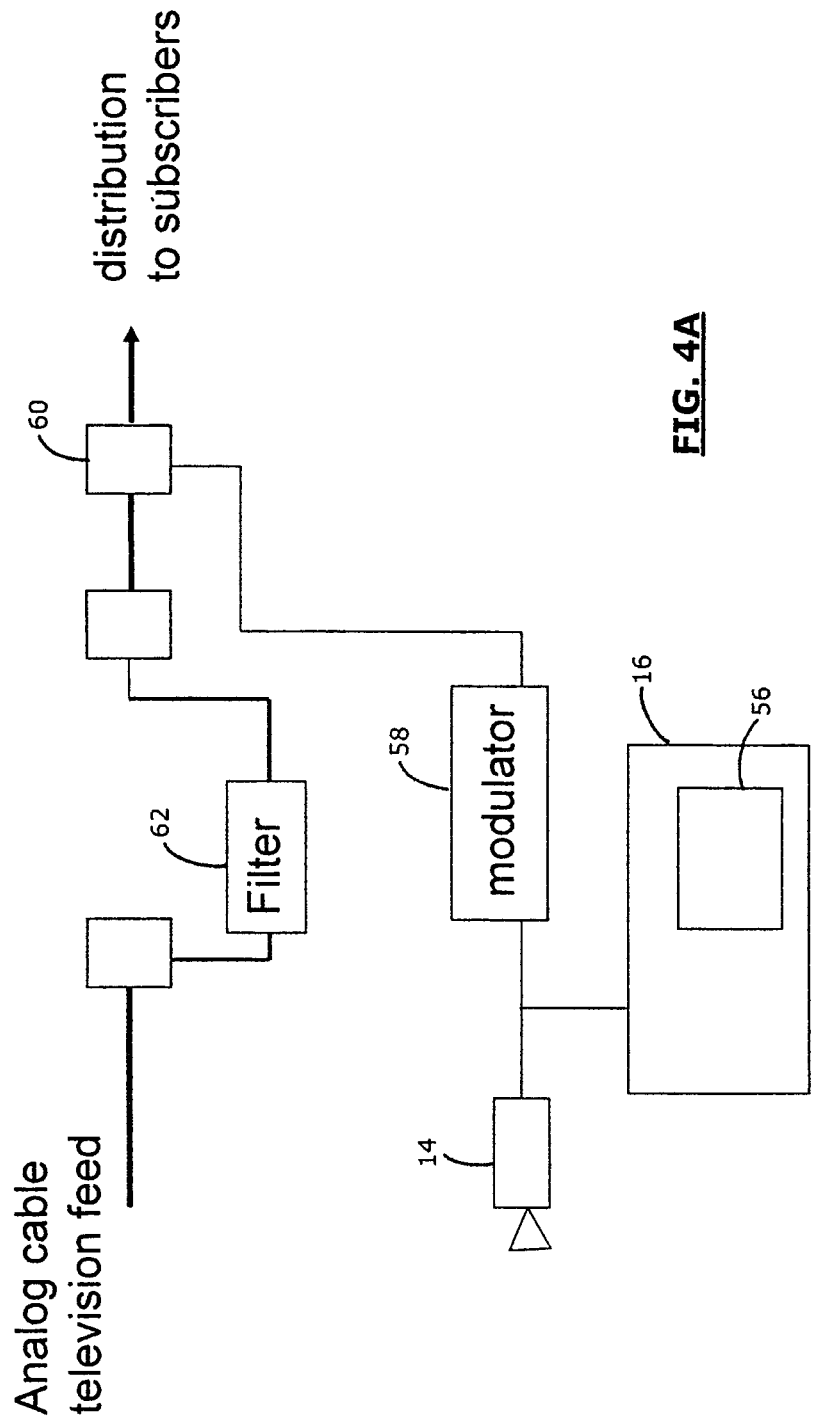

Referring to FIG. 4A, there is shown a system 10 according to an alternative embodiment of the invention, applied in a context where the subscribers receive an analog cable television feed. In this case, the processor 16 may include a converting application 56 for converting the supplemented CCTV signal generated by the combining application into an analog format. The resulting analog supplemented CCTV signal is then forwarded to a modulator 58 which modulates it according to a modulation format corresponding to a dedicated channel of the analog cable television feed at which the supplemented CCTV signal is to be viewed. The modulator 58 is connected to the incoming analog cable television feed at a point 60 before its distribution to the different subscribers, and the modulated analog supplemented CCTV signal is inserted in the analog cable television feed. Upstream of this connection, a filter 62 may be provided to remove the original signal associated to the dedicated channel from the analog television feed. The dedicated channel may be selected so that it does not correspond to a channel already dedicated to a broadcast feed. In one embodiment, the television feed deliberately includes one or more free channels for assignation to one or more supplemented CCTV signals.

It will be apparent to one skilled in the art that all of the residents of a MDU or building need not all subscribe to a same television service in order to benefit from the present invention, or that only a portion of these residents may receive the supplemented CCTV signal. For example, a portion of the residents of a MDU may receive the supplemented CCTV signal as part of a VDSL television feed, while another portion may view it on an analog television feed. In such a case, the supplemented CCTV signal may be generated by a same processor, connected to both the VDSL line to send the supplemented CCTV signal to a central office and to the incoming cable television feed to directly insert the supplemented CCTV signal therein. Alternatively, two different processors may be provided. In another embodiment, only residents subscribing to a digital television feed may receive the supplemented CCTV signal, while residents subscribing to an analog television feed only view the signal directly from the CCTV camera system, without the supplementary message. Such an embodiment is for example shown in FIG. 4B. In this case, a VDA is simply inserted between the camera system 14 and a modulator 58 modulating the signal from the CCTV camera system 14 for cable distribution. The VDA transmits a portion of this signal to the processor 16 which provides the supplemented CCTV signal to subscribers of the digital television feed. In the illustrated embodiment of FIG. 4B, the camera system 14 includes a plurality of individual cameras sequenced by a video sequencer 54. Of course, any other combination of services is also considered within the scope of the present invention.

Of course, numerous modifications could be made to the embodiments above without departing from the scope of the present invention as defined in the appended claims.

The invention claimed is:

1. A method for delivering a supplemented CCTV signal to one or more subscribers of a multi-dwelling unit (MDU), comprising:
   a) receiving at least one supplementary message to be provided to said one or more subscribers;
   b) combining a signal from a local CCTV camera system located at the MDU and said supplementary message into said supplemented CCTV signal, wherein said receiving and said combining occur at or proximate the MDU; and
   c) causing transmission of said supplemented CCTV signal to a respective set top box of each of said one or more subscribers as a dedicated channel of a digital commercial broadcast television feed, wherein said causing transmission comprises:
      i. forwarding said supplemented CCTV signal to a central office terminal supplying said digital commercial broadcast television feed to said one or more subscribers; and
      ii. integrating said supplemented CCTV signal in said dedicated channel of said digital commercial broadcast television feed supplied from said central office terminal.

2. The method according to claim 1, wherein said supplementary message comprises at least one of a text message, a graphical message, a sequence of graphical messages and a combination thereof.

3. The method according to claim 1, further comprising providing said supplementary message on a background template.

4. The method according to claim 3, wherein said background template comprises a plurality of background pages displayed in a sequence.

5. The method according to claim 3, wherein said combining comprises overlaying said signal from said local CCTV camera system on a portion of said background template.

6. The method according to claim 1, wherein said combining comprises overlaying said supplementary message on a portion of said signal from said local CCTV camera system.

7. The method according to claim 1, wherein said signal from said local CCTV camera system comprises sequenced signals from multiple cameras of said local CCTV camera system.

8. The method according to claim 1, wherein said signal from said local CCTV system comprises simultaneously displayed signals from multiple cameras of said local CCTV camera system.

9. The method according to claim 1, wherein said supplementary message is received from a source remote of the MDU.

10. The method according to claim 9, wherein said supplementary message is received through an internet connection.

11. The method according to claim 1, wherein said supplementary message is inputted at the MDU.

12. The method according to claim 11, wherein said supplementary message is generated at the MDU.

13. The method according to claim 11, wherein said supplementary message is uploaded at the MDU from a data storage medium.

14. The method according to claim 1, further comprising digitally encoding said supplemented CCTV signal after said combining.

15. The method of claim 1, wherein said causing transmission further comprises authorizing said one or more subscribers of the MDU to access said dedicated channel.

16. The method according to claim 1, wherein said forwarding comprises using an upstream bandwidth of a transmission line having a downstream bandwidth providing said digital commercial broadcast television feed to said one or more subscribers of the MDU.

17. The method according to claim 16, wherein said transmission line is a VDSL line and said method further comprises formatting said supplemented CCTV signal into a VDSL compatible format.

18. The method according to claim 1, wherein said digital commercial broadcast television feed is a digital commercial cable television feed.

19. A system for delivering a supplemented CCTV signal to one or more subscribers of a multi-dwelling unit (MDU), comprising:
  a processor located at or proximate the MDU and operable to:
    receive at least one supplementary message to be provided to said one or more subscribers;
    receive a signal from a local CCTV camera system located at the MDU; and
    combine said signal from said local CCTV camera system and said supplementary message into said supplemented CCTV signal; and
  transmission means operable to cause transmission of said supplemented CCTV signal to a respective set top box of each of said one or more subscribers as a dedicated channel of a digital commercial broadcast television feed, said transmission means comprising a central office terminal supplying said digital commercial broadcast television feed to said one or more subscribers, said central office terminal comprising:
    an interface operable to receive said supplemented CCTV signal from said processor; and
    an integrating module operable to integrate said supplemented CCTV signal in said dedicated channel of said digital commercial broadcast television feed supplied by said central office terminal.

20. The system according to claim 19, wherein said supplementary message comprises at least one of a text message, a graphical message, a sequence of graphical messages and a combination thereof.

21. The system according to claim 19, wherein said supplementary message is provided on a background template.

22. The system according to claim 21, wherein said background template comprises a plurality of background pages displayed in a sequence.

23. The system according to claim 21, wherein to combine said signal from said local CCTV camera system and said supplementary message into said supplemented CCTV signal, said processor is operable to overlay said signal from said local CCTV camera system on a portion of said background template.

24. The system according to claim 19, wherein to combine said signal from said local CCTV camera system and said supplementary message into said supplemented CCTV signal, said processor is operable to overlay said supplementary message on a portion of said signal from said local CCTV camera system.

25. The system according to claim 19, wherein said signal from said local CCTV camera system comprises sequenced signals from multiple cameras of said local CCTV camera system.

26. The system according to claim 19, wherein said signal from said local CCTV system comprises simultaneously displayed signals from multiple cameras of said local CCTV camera system.

27. The system according to claim 19, wherein said processor is a personal computer.

28. The system according to claim 19, wherein said processor comprises a port and said system further comprises a modem coupled to said port, said modem receiving the supplementary message from a source remote of said processor.

29. The system according to claim 28, said modem is connected to the internet.

30. The system according to claim 28, wherein said modem is one of a dial-up modem, a cable modem, a DSL modem, a VDSL modem, and a wireless modem.

31. The system according to claim 19, wherein said processor comprises an input interface for inputting said supplementary message in said processor.

32. The system according to claim 31, wherein said input interface comprises a keyboard connected to the processor for entering said supplementary message in said processor.

33. The system according to claim 31, wherein said input interface comprises at least one reader connected to the processor for uploading said supplementary message on said processor from a data storage medium.

34. The system according to claim 19, wherein said processor comprises a video capture application for digitally encoding said signal from said local CCTV system.

35. The system according to claim 34, wherein said processor comprises a combining module for combining the signal digitally encoded by the video capture application and said supplementary message into said supplemented CCTV signal.

36. The system according to claim 19, wherein said processor comprises an encoding module for encoding said supplemented CCTV signal into a format compatible with said digital commercial broadcast television feed.

37. The system according to claim 36, wherein said transmission means comprise a digital communication line providing said digital commercial broadcast television feed to said one or more subscribers of the MDU.

38. The system according to claim 37, wherein said digital communication line is a VDSL line.

39. The system according to claim 38, wherein said processor comprises a VDSL modem connected to said VDSL line.

40. The system according to claim 19, wherein said central office terminal comprises an authorization module operable to authorize said one or more subscribers of the MDU to access said dedicated channel.

41. A processor for generating a supplemented CCTV signal for delivery to one or more subscribers of a multi-dwelling unit (MDU), the processor being located at or proximate the MDU, the processor comprising:
  an input port in communication with a local CCTV camera system located at the MDU for receiving a signal therefrom;
  an interface operable to receive at least one supplementary message to be provided to said one or more subscribers;
  a combining module operable to combine said signal from said local CCTV camera system and said supplementary message into said supplemented CCTV signal;
  a configuring application operable to configure said supplemented CCTV signal into a format compatible for integration as a dedicated channel of a digital commercial broadcast television feed; and
  an output port in communication with a central office terminal supplying said digital commercial broadcast television feed to a respective set top box of each of said one or more subscribers, said central office terminal comprising an interface operable to receive said supplemented CCTV signal from the processor, and an integrating module operable to integrate said supplemented CCTV signal in said dedicated channel of said digital commercial broadcast television feed supplied by said central office terminal.

42. The processor according to claim 41, wherein said supplementary message comprises at least one of a text message, a graphical message, a sequence of graphical messages and a combination thereof.

43. The processor according to claim 41, wherein said supplementary message is provided on a background template.

44. The processor according to claim 43, wherein said background template comprises a plurality of background pages displayed in a sequence.

45. The processor according to claim 43, wherein said combining module is operable to overlay said signal from said local CCTV camera system on a portion of said background template.

46. The processor according to claim 41, wherein said combining module is operable to overlay said supplementary message on a portion of said signal from said local CCTV camera system.

47. The processor according to claim 41, wherein said signal from said local CCTV camera system comprises sequenced signals from multiple cameras of said local CCTV camera system.

48. The processor according to claim 41, wherein said signal from said local CCTV system comprises simultaneously displayed signals from multiple cameras of said local CCTV camera system.

49. The processor according to claim 41, wherein said processor is a personal computer.

50. The processor according to claim 41, wherein said interface comprises a port of said processor coupled to a modem, said modem receiving the supplementary message from a source remote of said processor.

51. The processor according to claim 41, wherein said interface comprises an input interface for inputting said supplementary message in said processor.

52. The processor according to claim 51, wherein said input interface comprises a keyboard connected to the processor for entering said supplementary message in said processor.

53. The processor according to claim 51, wherein said input interface comprises at least one reader connected to the processor for uploading said supplementary message on said processor from a data storage medium.

54. The processor according to claim 41, comprising a video capture application for digitally encoding said signal from the local CCTV system.

55. The processor according to claim 54, wherein said combining module is operable to combine the signal digitally encoded by the video capture application and said supplementary message into said supplemented CCTV signal.

56. The processor according to claim 41, wherein the configuring application is an encoding application for encoding said supplemented CCTV signal into a format compatible with said digital commercial broadcast television feed.

* * * * *